United States Patent [11] 3,598,916

[72] Inventor Robert B. Heick
Eatontown, N.J.
[21] Appl. No. 879,284
[22] Filed Nov. 24, 1969
[45] Patented Aug. 10, 1971
[73] Assignee Bell Telephone Laboratories, Incorporated
Murray Hill, N.J.

[54] MEASUREMENT OF MAXIMUM OF A SERIES OF TIME INTERVALS
11 Claims, 29 Drawing Figs.

[52] U.S. Cl. 178/69 A, 179/175.2 A, 328/111, 307/324
[51] Int. Cl. H04l 1/00, H04m 3/22, H04m 1/24
[50] Field of Search 178/69 R, 69 A; 179/175.2 A; 328/111, 130, 162; 307/324

[56] References Cited

UNITED STATES PATENTS 3,025,349 3/1962 Peterson 178/69 A
3,084,220 4/1963 Britt 178/69 A
3,182,127 5/1965 Wiese 178/69 A
3,420,950 1/1969 Britt 178/69 A

*Primary Examiner*—Kathleen H. Claffy
*Assistant Examiner*—Douglas W. Olms
*Attorneys*—R. J. Guenther and James Warren Falk

ABSTRACT: The circuit uses digital technique to measure the maximum break (or make) interval over a series of telephone dial pulses. During the first break, clock pulses are serially counted in a binary coded decimal up-counter. At the end of the first break, the up-count is transferred as a starting count to a binary coded reentrant down-counter of the same count capacity as the up-counter; and, the old (first) count is retained in the up-counter. During the second (new) break, clock pulses are serially subtracted from the count in the down-counter. Any clock pulses exceeding the number required to cause the count in the down-counter to go from zero count to capacity count are serially added to the old count in the up-counter. At the end of each new measured break, the up-counter contains the maximum of the old and new counts, the maximum count is transferred to the down-counter as a new starting count, the maximum count is retained in the up-counter, and the process repeats. Visual display is provided of the maximum count by translation from clock pulse count in the down-counter to milliseconds.

INVENTOR
R. B. HEICK
BY [signature]
ATTORNEY

NAND

NAND

INVERTER

INVERTER

LOGICAL AND

LOGICAL AND

DELAY

DELAY

DELAY

SINGLE SHOT

SINGLE SHOT

SINGLE SHOT

DELAYED SINGLE SHOT

DELAYED SINGLE SHOT

DELAYED SINGLE SHOT

REGENERATION

REGENERATION

REGENERATION

J K FLIP FLOP

D-TYPE FLIP FLOP

DECADE DOWN COUNTER

DECADE DOWN COUNTER

BINARY CODED DECIMAL COUNTER

DECADE UP COUNTER

SIGNALS

MEASUREMENT OF MAXIMUM OF A SERIES OF TIME INTERVALS

BACKGROUND OF THE INVENTION

This invention relates generally to the field of time interval measurement and particularly to the measurement of the longest or maximum time interval among a series of time intervals.

Prior art, such as U.S. Pat. Nos. 3,025,349 to Peterson of Mar. 13, 1962 and 3,182,127 to Wiese of May 4, 1965, has used two registers for registering indications of the lengths of old and new time intervals and separate circuits, such as adders or comparators, for ascertaining which of the two time intervals is the longer (maximum). In Peterson, at the end of the new interval measurement, the old measurement is subtracted (by complementary parallel addition) from the new measurement to determine whether to retain the old or new measurement as the maximum for comparison with a further time interval measurement. In Wiese, a comparing circuit compares the new measurement, as it is being made, with the old measurement to determine which one to retain as the maximum.

While such prior art as Peterson and Wiese seem quite suitable for their purposes, it is always desirable, wherever possible, to reduce the amount or number of circuits required to perform logical operations. An application of H. Mann and J. A. Whiteaker, Ser. No. 879,262, for "Measurement of Maximum of a Series of Time Intervals," filed on Nov. 24, 1969 and allowed on Feb. 16, 1971, discloses and claims an arrangement for measuring the maximum of a series of time intervals using two registers, as in such prior art as Peterson and Wiese, but without the necessity of special adder or comparator circuitry.

The Mann-Whiteaker arrangement uses clock-controlled digital technique to control two binary coded decimal upcounters of the same count capacity. At the end of any measurement, one counter, which is reentrant, contains the nine's complement of the last clock pulse count in the other counter. The next clock pulse count is serially added to the nine's complement count; and, a change from capacity count to zero count in the reentrant counter causes further clock pulses to be serially added to the count in the other counter, such that the latter contains a pulse count indicative of the maximum measured time interval.

An arrangement like that of Mann and Whiteaker requires that the two registers be engineered so that the registering codes used are self-complementing decimal codes to enable the transfer of a count from one register to the other as the nine's complement in order to enable the nine's complement register to ascertain, by complementary addition, whether the next count is larger than the previous count.

The present invention provides an arrangement similar to that of Mann and Whiteaker except that the special self-complementing decimal coding is not necessary, thus rendering the equipment engineering less complicated and more economical.

SUMMARY OF THE INVENTION

The present invention contemplates digital technique for using a clock pulse generator to control two pulse count registers such that (1) during the measurement of the first of a series of time intervals one register contains a pulse count of clock pulses occurring during the first time interval, (2) at the end of each measured time interval the other register contains as a starting count the same pulse count then in the one register, (3) during each measured time interval succeeding the first interval clock pulses are serially subtracted from the starting pulse count in the other register, and (4) during each measured time interval succeeding the first interval the pulse count in the one register is made equal to the sum of the starting pulse count plus the number, if any, of clock pulses in excess of the number required to reduce below zero the starting count in the other register.

Particularly, the present invention contemplates retaining each successive pulse count sum in the one register and adding to that sum all clock pulses, if any, exceeding the number required to reduce below zero each preceding starting pulse count in the other register such that at the end of each measurement the one register contains a pulse count indicative of the maximum measured time interval.

BRIEF DESCRIPTION OF THE DRAWING

The drawing consists of FIGS. 1 through 29 arranged on seven sheets as follows.

DETAILED DESCRIPTION

The detailed description of the exemplary embodiment is arranged in four main parts: the Circuit Symbols; the Signals; the Block Diagram; and, the Detailed Circuit Disclosure. These parts will be dealt with in the above order under the indicated headings.

CIRCUIT SYMBOLS

Figure 27:
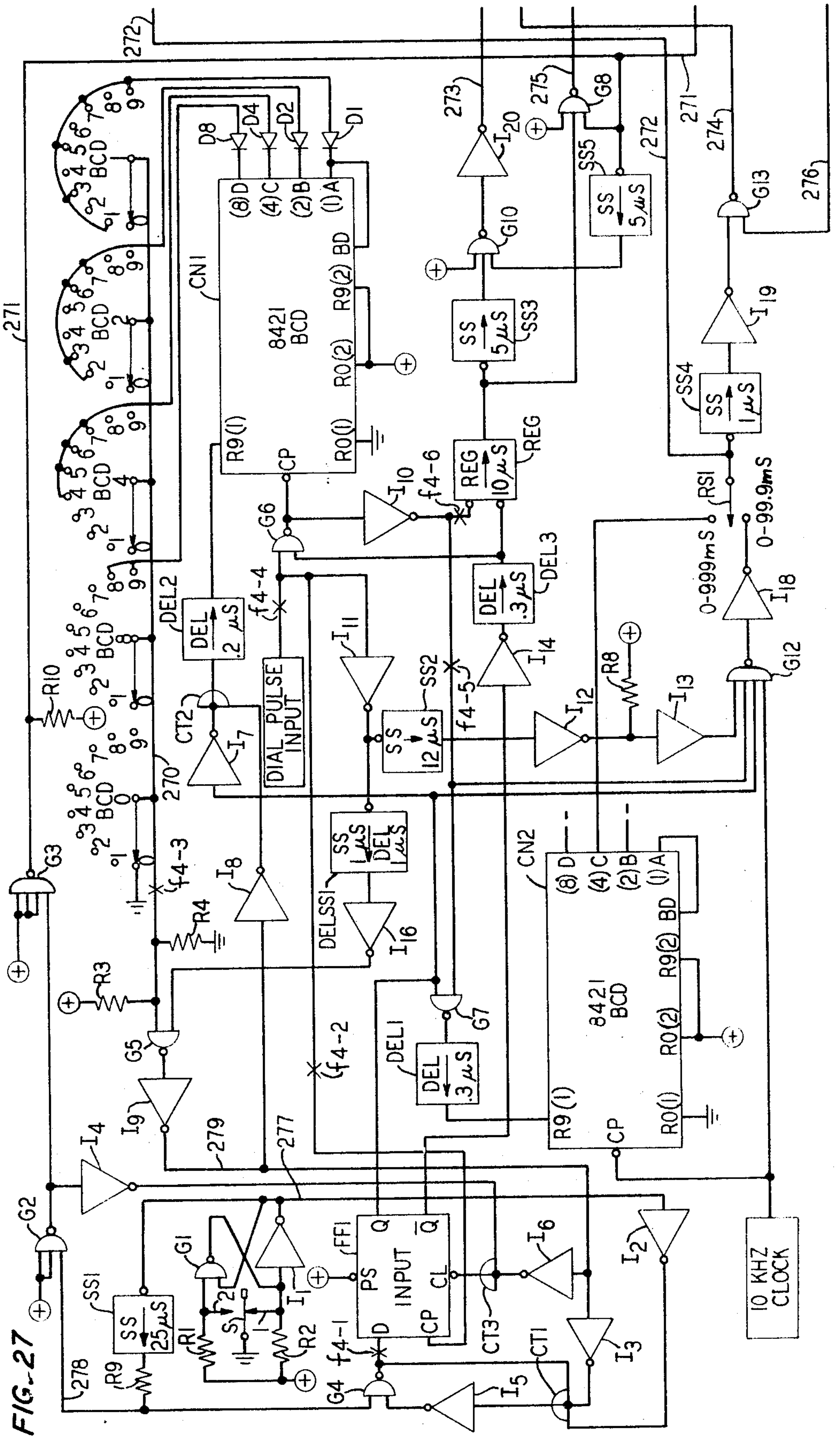
Figure 28:
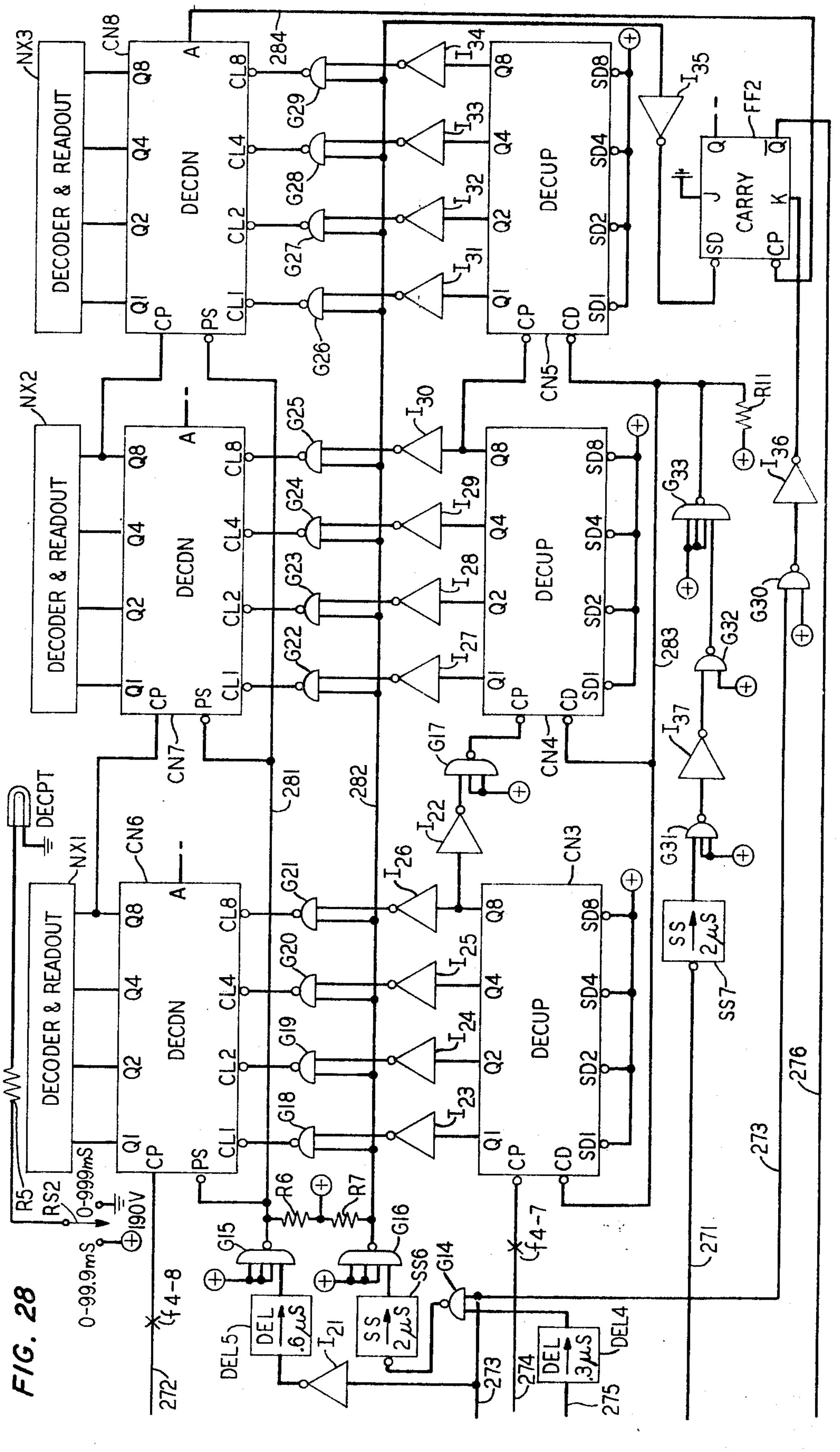

The following, under suitable headings, explain conventions and symbols as used in the detailed circuit layout of FIGS. 27 and 28. In explaining the action of the circuit components, it is assumed that they are connected as shown in FIGS. 27 and 28. The diagrams used to explain the action of the components are not intended to represent true waveforms, but merely to illustrate the logic level functions of the components in the context of FIGS. 27 and 28.

BATTERY AND GROUND

A circle with a plus sign (+) indicates the positive terminal of a source of direct current supply, the negative terminal of which is assumed to be connected to ground, which is considered as zero potential. The direct-current voltage is 5 volts unless otherwise indicated.

DETACHED CONTACTS

A cross mark (X) on a conductor indicates a pair of electrical contacts associated with a switch. The contacts complete the circuit path when the switch is operated and open the circuit when the switch is not operated (released).

HIGH AND LOW SIGNALS

A potential condition, whether steady or transient, is said to be a high logic level if it is 2 volts or more positive. A low logic level condition is a voltage not more positive than about one-half of a volt.

NAND GATE

Figure 2:
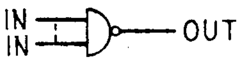
FIGS. 2 through 25 show circuit components and symbols used in the detailed circuitry of FIGS. 27 and 28; and, FIG. 26 is a chart illustrating various aspects of telephone dial pulses used by example as the source of time intervals to be measured.

FIG. 2 shows the symbol for a typical NAND gate such as Motorola integrated circuit MC830 and the like.

Figure 3:
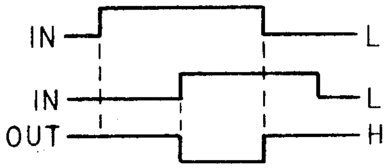

FIG. 3 shows the circuit action of the NAND gate. The output will be low only if all inputs are high: otherwise, the output will be high.

INVERTER

Figure 4:
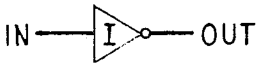

FIG. 4 shows the symbol for a typical inverter such as Motorola integrated circuit MC836 and the like.

Figure 5:
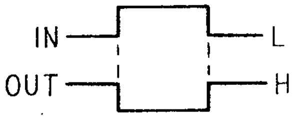

FIG. 5 shows the circuit action of the inverter. The output will be the inverse of the input. That is, a low input produces a high output and a high input produces a low output.

LOGICAL AND

Figure 6:
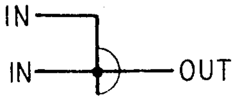

FIG. 6 shows the symbol used to indicate an electrical connection referred to as a "collector tie," which is the electrical paralleling of outputs from two or more NAND gates or inverters or both.

Figure 7:
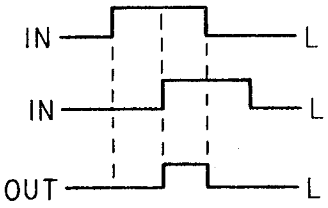

FIG. 7 shows the effect of the logical AND connection. The output is high only when all inputs are high: otherwise, the output is low.

DELAY

Figure 8:
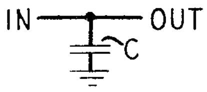

FIG. 8 shows how a capacitor can be connected to a conductor such that a delay is attached to each low-to-high transition. The amount of delay is a function of the value of the capacitor C and the amount and nature of connecting circuits.

Figure 9:
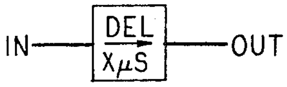

FIG. 9 shows the symbol for a delay circuit with an arrow pointing in the direction of the effect of the delay. The symbol includes the amount of delay (microseconds μsec. or milliseconds msec.) where pertinent.

Figure 10:
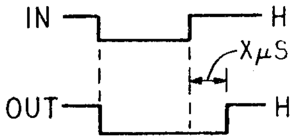

FIG. 10 shows the action of the delay circuit. A low-to-high transition at the input is delayed by *x* μsec. at the output due to a controllable charging time of capacitor C. No delay to speak of is experienced at the output by a high-to-low transition at the input since the discharge path of capacitor C is arranged to be very fast.

SINGLE-SHOT

Figure 11:
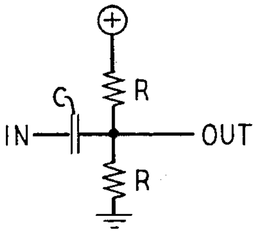

FIG. 11 shows how a single-shot circuit may be made to produce a high-to-low output of a specified short width from a longer high-to-low input.

Figure 12:
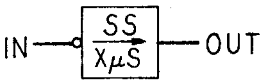

FIG. 12 shows the symbol for a single-shot like that of FIG. 11.

Figure 13:
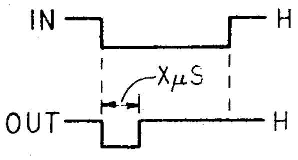

FIG. 13 shows the circuit action of the single shot. A high-to-low transition at the input will produce at the output a high-to-low transition lasting for *x* μsec. Normally, the output is high by virtue of the resistance divider. Low-to-high transitions at the input will not affect the logic level of the output. However, a high-to-low transition of the input will at once provide a high-to-low transition at the output, followed by a charging time of *x* μsec. for capacitor C to charge up to the high level.

DELAYED SINGLE-SHOT

Figure 14:
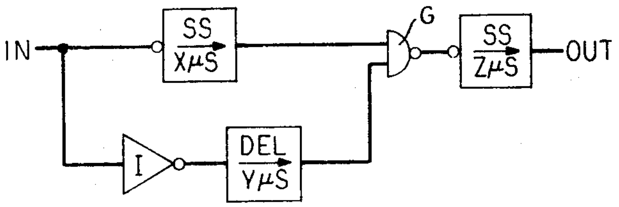

FIG. 14 shows how a delayed single-shot circuit may be made to produce a high-to-low output of a specified short width delayed a specified time from the controlling high-to-low transition of a longer input.

Figure 15:
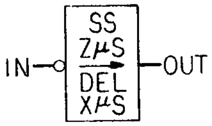

FIG. 15 shows the symbol of a delayed single-shot circuit like FIG. 14.

Figure 16:
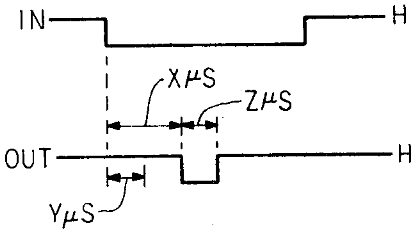

FIG. 16 shows the circuit action of the delayed single-shot. Under steady state conditions, the output is high from the single-shot Z. No change at the input, except a high-to-low, will affect the logic level of the output. When a high-to-low input occurs, the upper input of gate G will go low for *x* μsec. and then return to high and the lower input of gate G will stay low for *y* μsec. and will then go high. When both inputs of gate G go high (at the end of *x* μsec.), the output of G will go low to cause the output to produce a single-shot low pulse of *z* μsec. Thus, the high-to-low input has caused the output to delay *x* μsec. and then produce a single-shot low of *z* μsec.

REGENERATION

Figure 17:
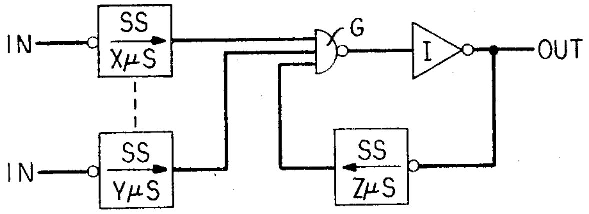

FIG. 17 shows how a regeneration circuit may be made for producing a relatively long high-to-low output from a shorter high-to-low input.

Figure 18:
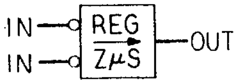

FIG. 18 shows the symbol for a regeneration circuit for producing a pulse of *z* μsec. width.

Figure 19:
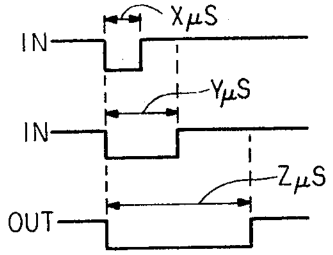

FIG. 19 shows the circuit action of a regeneration circuit like FIG. 17. Under steady state conditions the three inputs to gate G are high, thus producing a low input to the inverter I and a high output. No change on any input, except a high-to-low transition, will affect the output. A high-to-low input to single-shot X will produce at the upper input to gate G a high-to-low pulse lasting *x* μsec. Similarly, a high-to-low input to single-shot Y will produce at the middle input to gate G a high-to-low pulse lasting *y* μsec. The leading edge (high-to-low) of either of these inputs to gate G will cause the output of gate G to go high and the output of the inverter to go low. The single-shot Z will produce at the lower input of gate G a high-to-low pulse lasting *z* μsec., which holds the output of G high and the output of the inverter low until the end of the *z*-μsec. interval, at which time all three inputs of gate G will again be high. This will cause the output of the inverter to again be high.

JK FLIP-FLOP

Figure 20:
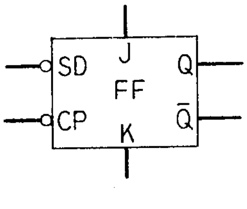

FIG. 20 shows a typical JK flip-flop such as Motorola integrated circuit MC853 and the like. SD is the direct set input, CP is the clock pulse input, Q is the "1" output, and $\overline{Q}$ is the "0" output. Q and $\overline{Q}$ are inversions: $\overline{Q}$ will always be the opposite of Q: if Q changes, $\overline{Q}$ will change. Whenever SD is low, a direct set condition prevails with Q high and $\overline{Q}$ low. Whenever SD is high and CP is low, changes in the J and K information will not affect the state of Q and $\overline{Q}$. Whenever SD is high, a high-to-low transition on CP will change the state of Q and $\overline{Q}$ or not depending upon the condition of inputs J and K. The J and K information is assumed to be changed. If at all, while the CP lead is low. The following indicates the action of the circuit with SD high, the J and K information established, and the CP lead going from high-to-low. If J and K are low, Q does not change. If J is low and K is high, if Q is low it will stay low and if Q is high it will go low. If J is high and K is low, if Q is high it will stay high and if Q is low it will go high. If J and K are high, Q changes (toggles). The above information is summarized in the following table:

| SD | CP | J | K | Q | $\overline{Q}$ |
|---|---|---|---|---|---|
| L | X | X | X | H | L |
| H | L | X | X | √ | √ |
| H | P | L | L | √ | √ |
| H | P | L | H | L/L | H/H |
| H | P | L | H | H/L | L/H |
| H | P | H | L | L/H | H/L |
| H | P | H | L | H/H | L/L |
| H | P | H | H | L/H | H/L |
| H | P | H | H | H/L | L/H |

P ... means a pulse from high-to-low
L ... means low
H ... means high
√... means no change of state
L/H, etc. ... means a change of state
H/H, etc. ... means no change of state
X ... means not controlling.

D-TYPE FLIP-FLOP

Figure 21:
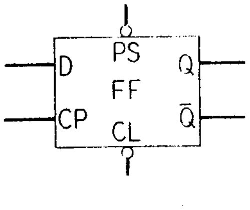

FIG. 21 shows a typical D-type flip-flop such as Texas Instruments integrated circuit SN7474 and the like. D is the data input, CP is the clock pulse input, PS is the preset input, CL is the clear input, Q is the "1" output, and $\overline{Q}$ is the "O" output. With PS low and CL high, a preset condition exists (Q high and $\overline{Q}$ low). With PS high and CL low, a clear condition exists (Q low and $\overline{Q}$ high). With PS high and CL high, Q is made the same as the high or low condition of the D input when CP is pulsed low-to-high. At all other times, Q and $\overline{Q}$ are unaffected by changes on the D input. The following table summarizes the above.

| CP | D | PS | CL | Q | $\overline{Q}$ |
|---|---|---|---|---|---|
| X | X | L | H | H | L |
| X | X | H | L | L | H |
| P | L | H | H | L | H |
| P | H | H | H | H | L |

P ... means a pulse from low-to-high
L ... means low
H ... means high
X ... means not controlling

DECADE DOWN-COUNTER

Figure 22:
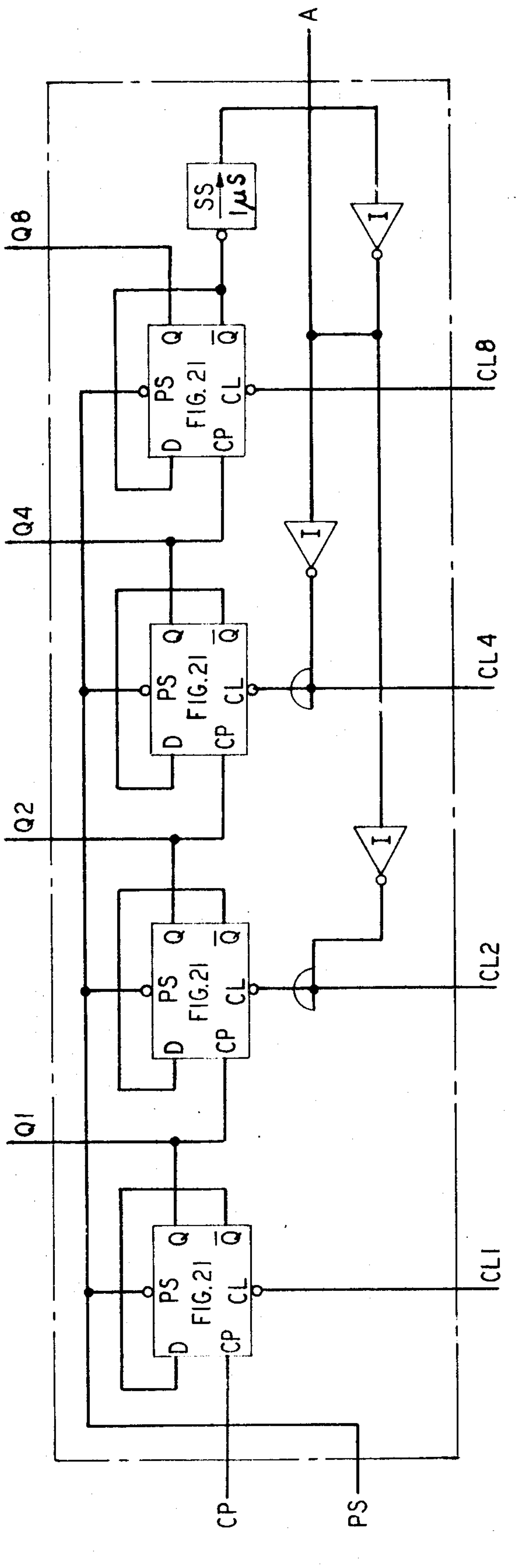
Figure 23:
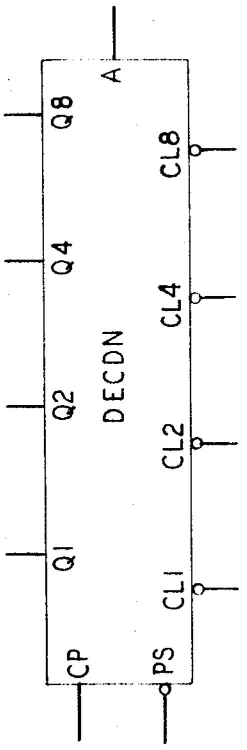

FIG. 22 shows how flip-flops like FIG. 21 may be arranged as a decade down-counter, the symbol for which is shown in FIG. 23. The CL1, CL2, CL4, and CL8 inputs are normally high. The preset lead PS is normally high: making the PS lead low will preset all flip-flops to Q high and $\overline{Q}$ low. The A output is normally low: the A output will carry a low-to-high pulse whenever the Q8 stage changes to Q high and $\overline{Q}$ low. The clock pulse lead CP is effective to control the flip-flops only when the CP lead is pulsed low to high.

With the leads CL1, CL2, CL4 and CL8 high, whenever PS goes from high to low all stages are preset to Q high and $\overline{Q}$ low (a count of 15 or 1111 in binary code). With PS high, any lead CL1, CL2, CL4 or CL8 going low will clear the corresponding stage to Q low and $\overline{Q}$ high. The CL leads are used to set the down-counter to a certain decimal value such as nine (1001, using decimal weighings of 1, 2, 4 and 8 for Q1, Q2, Q4 and Q8).

With a value set in the down-counter, such as nine with Q1 high, Q2 low, Q4 low and Q8 high (1001), with input PS high, and with all CL inputs high, positive (low-to-high) pulses on input CP will cause the down-counter to down count to zero (0000). The next clock pulse will set all stages to fifteen (1111); but, the single-shot circuit connected to the Q output lead of stage Q8 will provide a 1 μsec. negative (high-to-low) pulse to clear stages Q2 and Q4 so as to make Q2 low and Q4 low. This changes the down-counter to a value of nine (1001), the initial starting point. The down-counter thus functions as a decimal down-counter which goes from zero (0000)to nine (1001) instead of from zero (0000) to 15 (1111); and, each time the counter goes from a count of zero (0000) to a count of nine (1001), the A output provides a short high pulse.

8421 BCD COUNTER

Figure 24:
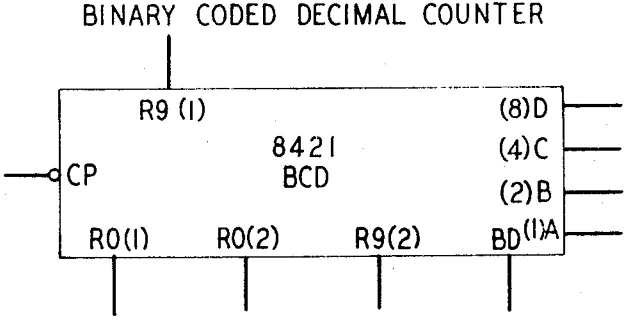

FIG. 24 shows the symbol of a typical decade counter such as Texas Instruments integrated circuit SN7490 and the like. The binary coded decimal weighings of the output leads A, B, C and D are 1, 2, 4 and 8 respectively. Used as a symmetrical divide-by-ten counter, the D output is connected to the CP input, BD is the input, and A is the output. Used as a binary coded decimal counter, BD is connected to A, and CP is the input.

As a BCD counter, if RO(1) and RO(2) are high and at least one of R9(1) and R9(2) is low, the counter is forced into and is held in state zero (0000). If R9(1) and R9(2) are high, the counter is set and is held in state nine (1001). If RO(1) or RO(2) or both are low and R9(1) or R9(2) or both are low, the following table shows the states of the A, B, C and D outputs as the clock pulse input CP(P) receives high-to-low pulses:

| | 1 | 2 | 4 | 8 | |
|---|---|---|---|---|---|
| CP | A | B | C | D | Decimal count |
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |

Etc.

DECADE UP-COUNTER

Figure 25:
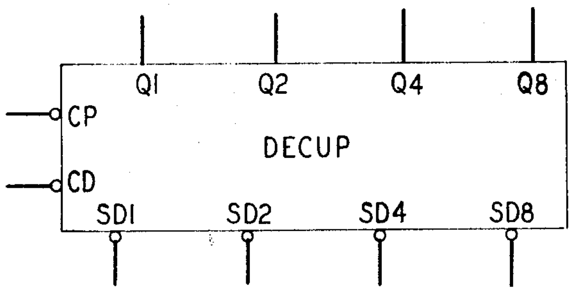

FIG. 25 shows a typical binary coded decimal counter such as Motorola integrated circuit MC838 and the like. With all SD inputs high and with input CD low, the counter goes to state zero (0000) with Q1, Q2, Q4 and Q8 each low. With the CD input high, any of the SD inputs being pulsed high to low will set the corresponding stage into state "1" with the corresponding Q1, Q2, Q3 or Q8 high. With input CD high and all SD inputs high, the internal circuitry is arranged so that the counter will progress through 10 decimal counts and repeat as long as the clock pulse lead CP is pulsed (P) negatively (high to low). The following table shows the action of the counter:

| | | | 1 | 2 | 4 | 8 | |
|---|---|---|---|---|---|---|---|
| CD | SD | CP | Q1 | Q2 | Q4 | Q8 | Decimal count |
| H | H | P | L | L | L | L | 0 |
| H | H | P | H | L | L | L | 1 |
| H | H | P | L | H | L | L | 2 |
| H | H | P | H | H | L | L | 3 |
| H | H | P | L | L | H | L | 4 |
| H | H | P | H | L | H | L | 5 |
| H | H | P | L | H | H | L | 6 |
| H | H | P | H | H | H | L | 7 |
| H | H | P | L | L | L | H | 8 |
| H | H | P | H | L | L | H | 9 |
| H | H | P | L | L | L | L | 0(10) |
| H | H | P | H | L | L | L | 1 |

Etc.

SIGNALS

Figure 26:
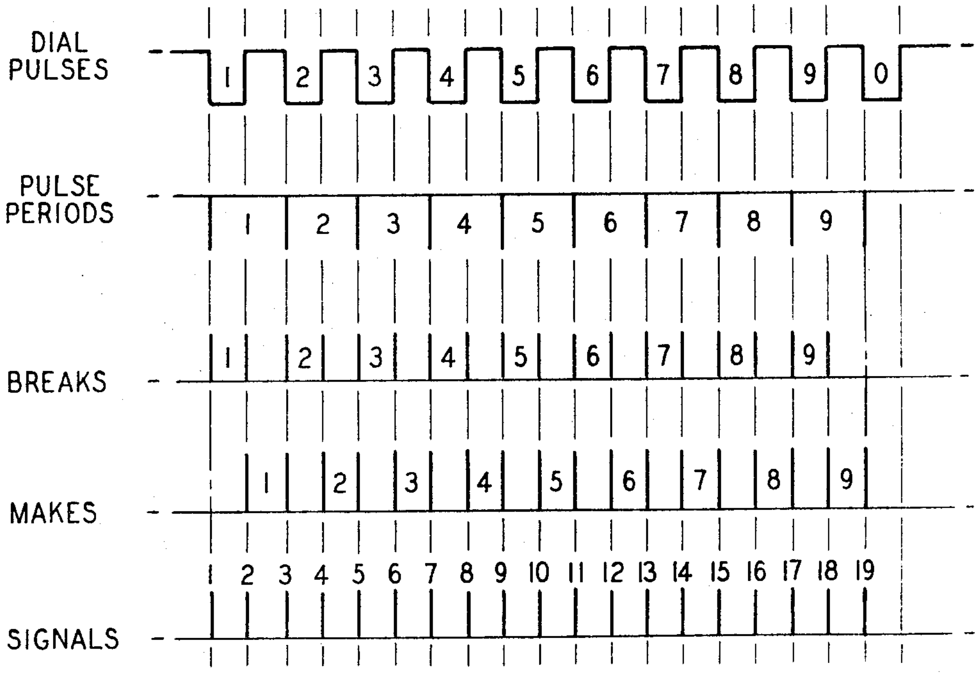

Since the exemplary disclosure is part of a test set for measuring various aspects of telephone dial pulses, FIG 26 is provided to explain the type of pulsing involved and the significant signals which can be derived from such pulsing.

The top line in FIG. 26 shows a series of 10 break intervals and the nine intervening make intervals making up nine full pulse periods. Nominally, telephone dials will pulse at the rate of about 10 pulses (pulse periods) per second with about a 50—60 percent break and a corresponding 50—40 percent make (percentage of total pulse period). Of course, the pulsing speed and percentages can vary quite widely, as is well known. In FIG. 26, the top line designates the 10 break intervals, the second line designates the nine full pulse periods, the third line designates the nine break intervals of the first nine pulse periods, and the fourth line designates the nine make intervals of the first nine pulse periods. The fifth line shows the nineteen signals (transitions) definitive of the parts of the first nine pulse periods.

In measuring dial pulses, or any other similar time interval phenomenon, it will be appreciated that any of the makes, breaks, pulse periods, or pulse transitions can be arranged by suitable well-known circuitry to be of any desired polarity depending upon the requirements of the circuit controlled thereby. For example, in the detailed circuitry to be described hereinafter, it has been convenient to discuss responses to positive or high signals even though the particular time intervals of interest, such as the break intervals of FIG. 26, may sometimes be thought of in the opposite sense. Likewise, the make intervals will be considered as negative or low even though they may generally be considered in the reverse sense.

It is desirable when using clock-controlled measuring circuitry, as in the exemplary disclosure, to arrange the dial pulse input circuit so that the input dial pulses are synchronized with the clock. This will insure that switching and logic functions are performed with the minimum amount of error. Such an arrangement for clock synchronization of otherwise random input pulses is disclosed and claimed in an application of R. B. Heick, Case 4, filed on Aug. 14, 1969, allowed on Dec. 16, 1970 and entitled "Delayed Clock Pulse Synchronizing of Random Input Pulses." However, as mentioned hereinafter, the present circuit can measure input signals not synchronized with the clock pulses and can do so with negligible error.

BLOCK DIAGRAM

Figure 1:
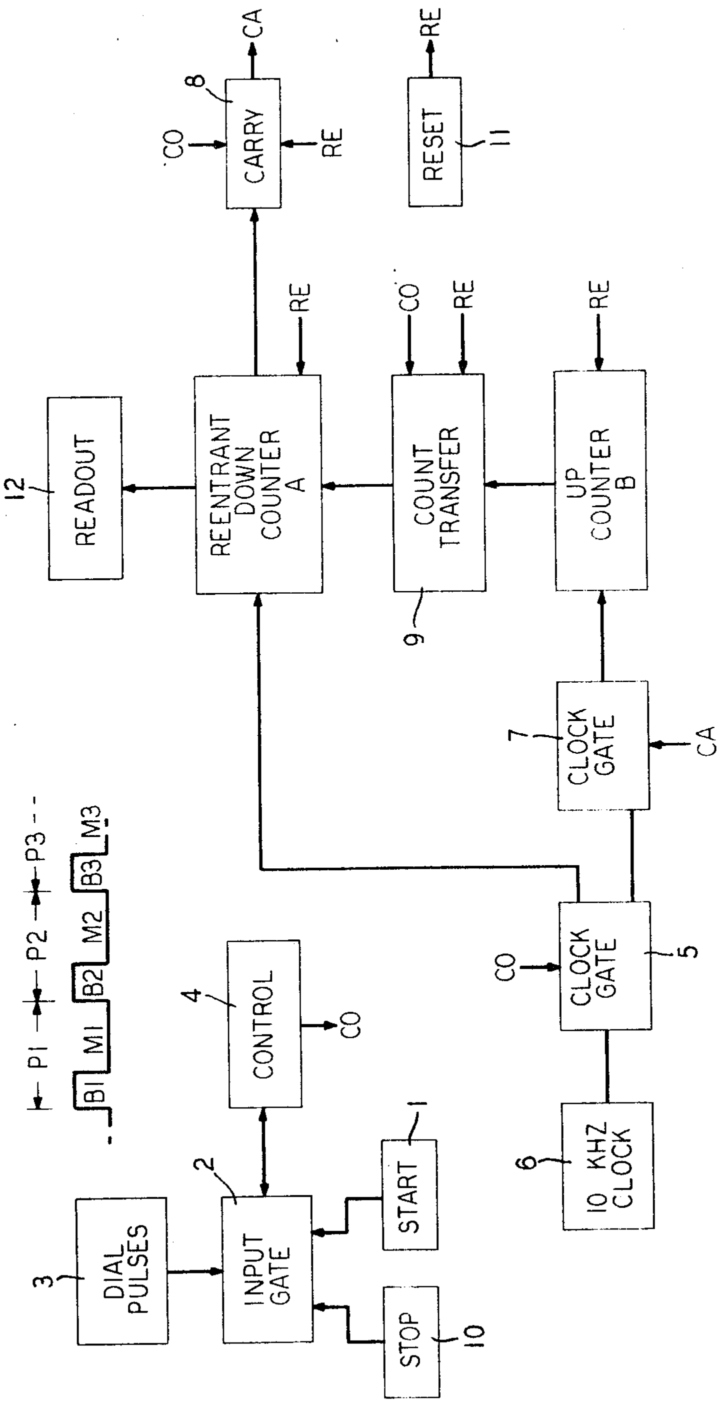
FIG. 1 is a block diagram of the detailed circuit embodiment shown in FIGS. 27 and 28 arranged as shown in FIG. 29 (on same sheet as FIG. 1)

The block diagram of FIG. 1 shows the main functional parts of the detailed circuit of FIGS. 27 and 28. Two full pulse periods P1 and P2 and part of a third pulse period P3 are shown, each divided into break (B1, B2 and B3) intervals and make (M1, M2 and M3) intervals. The breaks have been shown as positive or high since the circuitry is arranged to be responsive to high signals (or low-to-high transitions) FOR MEASUREMENT PURPOSES AND SINCE IT HAS BEEN ASSUMED THAT MAXIMUM BREAK IS TO BE MEASURED.

The system is cleared (such as by operating the reset 11) for use by setting up-counter B and down-counter A each to zero count, counters A and B having the same count capacity. When the start circuit 1 is energized, the input gate 2 is enabled to be controlled by the input dial pulses 3. As the dial pulses arrive at the input gate 2, signals will pass from the input gate 2 to the control 4 so that the control 4 knows when break intervals B1, B2, B3, etc. begin and end.

At the start of the first break B1, the control 4, over control lead CO, enables clock gate 5 to pass clock pips from the 10 kHz. clock source 6 to counter A and to clock gate 7. Since counter A was preset to zero count, the first clock pip will cause the A count to down-count from zero count to capacity (maximum) count, causing carry 8 to produce a carry signal on lead CA The carry signal on lead CA enables clock gate 7 to pass clock pips to cause counter B to up-count. The carry 8 remains as set throughout the first break B1 such that clock pips are fed to counters A and B during the entire break B1.

At the end of the first break B1 (i.e., the start of the first make M1), the control 4, over control lead CO, disables clock gate 5 to prevent passage of any further clock pips through clock gates 5 and 7. Also, at the end of break B1, the control 4, over control lead CO, resets the carry 8 and enables the count transfer 9. Carry 8, in being reset, removes the carry signal from lead CA to disable clock gate 7 to prevent clock pips from passing therethrough to counter B. When the count transfer 9 is enabled, the count in B is transferred to A as a new count in A. The count in B is retained therein.

At this point in time, counter B contains a clock pip count indicative of the time interval or duration of the first break B1; and, counter A contains the same clock pip count as in B.

At the start of the second break B2 (at the end of the first make M1), the control 4 will have disabled the count transfer 9 over lead CO and enables clock gate 5 over lead CO. Clock gate 7 is disabled since the carry signal has been removed from lead CA by the resetting of the carry 8. Clock pips from the clock 6 are passed by clock gate 5 into counter A where they are serially subtracted (down-counted) from the count in A. Since counter A contains a count which is the same as the count in B, the number of clock pips required to cause counter A to arrive at zero count is the same as the count existing in counter B.

If the second break B2 is equal to or of less duration than the first break B1, counter A will not reduce its count below zero. In such a case, the end of the second break B2 (start of the second make M2) will cause the control 4 to disable clock gate 5 and to transfer to counter A (as a new count) the old (and longer or maximum) count still in counter B.

If the second break B2 is greater than (longer—of more duration) the first break B1, counter A will be driven to zero count, then to capacity count, and then to another dissipative clock pip count until the end of break B2. When counter A goes from zero count to capacity count, the carry 8 is set to provide a carry signal on lead CA The carry signal on lead CA thereupon enables clock gate 7 to add further clock pips serially to the old count in B. The result is that at the end of break B2, counter B will contain a clock pip count representative of the then maximum break interval B2.

At the end of the second break B2, the control 4 again transfers the B count into A, disables clock gate 5, and, if necessary, resets the carry 8.

The above process is repeated for each break interval B3, etc. until the circuit action is stopped, either manually or automatically. The circuit can be stopped manually at any time by manipulation of the stop circuit 10, whereupon the input gate 2 is disabled and the control 4 prevents any further action of the circuitry. Although not shown in FIG. 1, means is provided whereby the control 4 may cause an automatic stop after having processed a prescribed number of time interval measurements.

The readout 12 is a combined decoder and lamp display device whereby the count existing in counter A after transfer (i.e., the then maximum break count) is decoded from the binary form in counter A into decimal form for lighting the display to show the maximum break in milliseconds.

The circuitry is arranged, as will be obvious, to measure makes or pulse periods if desired, in addition to breaks. All that is necessary is for the input circuit to arrange and feed to the input gate 2 the appropriate ones of the signals shown in FIG. 26.

DETAILED CIRCUIT DISCLOSURE

Figure 29:
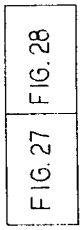

With reference to the detailed circuit disclosure of FIGS. 27 and 28 (see FIG. 29 on same sheet as FIG. 1), certain switches, contacts and controls may warrant brief comment. In FIGS. 27 and 28 are shown two switch arms designated RS1 and RS2: these represent ganged switch arms on a Range Switch, the arms operable into one position (0—99.9 msec.) or the other (0—999 msec.) for making respective measurements of a time interval of less than 100 milliseconds (msec.) or more than 99.9 msec. In FIG. 27, when measuring an interval of less than 100 msec., the output of inverter I18 is connected to the input to single-shot SS4; whereas, when measuring an interval of more than 99.9 msec., the C output of counter CN2 is connected to the input to SS4. In FIG. 28, when measuring an interval less than 100 msec., the decimal point lamp DECPT is lit by being connected to the +190-volt source; whereas, when measuring an interval more than 99.9 msec., the decimal point lamp DECPT is extinguished since it is connected to ground on both sides. In FIGS. 27 and 28 are shown make contacts F4–1 through F4–8: these contacts are closed when the F4 switch is operated to adjust the circuit for measuring maximum break intervals. In FIG. 27 is shown a switch S (upper left) with its movable arm shown in contact with a back contact 1 and movable into contact with a make contact 2. Switch S represents a locking pushbutton switch which when in one position will remain there until the button is pushed, whereupon the switch goes to the other position and remains there until the button is pushed again, etc. When the movable arm of switch S is moved upward, the back contact 1 opens before the make contact 2 closes; and, when the arm of switch S is moved downward (to the position shown), make contact 2 opens before the back contact 1 closes. In the upper part of FIG. 27 are shown five rotary switches BCDO, BCD8, BCD4, BCD2 and BCD1: these switches are ganged to rotate in synchronism. In the position shown, the upper input to gate G5 is connected over contact F4-3 and lead 270 to ground at the "0" contact of switch BCDO: in this position of the BCD switches, the circuit is adjusted for continuous operation. When the BCD switches are set in any other position (1 to 9), the circuit is adjusted to stop automatically after measuring the corresponding number of time intervals.

STARTING CONDITIONS

The following test conditions are assumed:

1. switch F4 is operated to enable maximum break measurements;
2. the Range Switch is operated so that contact arms RS1 and RS2 are in the 0—99.9-msec. positions since it will be assumed that the intervals to be measured are less than 100 msec.;
3. the BCD switches of FIG. 27 are in the position shown for enabling continuous operation; and,
4. the DIAL PULSE INPUT box in FIG. 27 provides a series of telephone dial pulses, such as in FIG. 26, with the breaks high and the makes low.

With the Range Switch in the 0—99.9-msec. position, the decimal point lamp DECPT in FIG. 28 is lit in an obvious circuit through resistance R5 to the +190-volt direct-current source: also, in FIG. 27, the C output of counter CN2 is disconnected from the circuit, with the output of I18 connected to lead 272 and to the input to SS4. The decoder and readout circuits NX1, NX2 and NX3 of FIG. 28 represent binary-to-decimal translators for converting the binary count in counters CN6, CN7 and CN8 to equivalent decimal values to light decimal lamps (0 to 9). When the decimal point lamp DECPT is lit and physically located between NX1 and NX2, and when the lamp display is read in the order of NX3 to NX2 to NX1, then NX3 shows the tens of milliseconds, NX2 shows the units of milliseconds, and NX1 shows the tenths of milliseconds. If the Range Switch were in the position 0—999 msec., then the lamp DECPT would be extinguished to permit NX3, NX2 and NX1 to show respective hundreds, tens and units of milliseconds as registered in respective counters CN8, CN7 and CN6.

CLEARING THE CIRCUIT

The circuit is cleared (initialized, normalized) by the operation in FIG. 27 of the switch S to its upper position (the clear-start position). This operation of switch S results in the following circuit functions:

1. the input flip-flop FF1 is cleared to its zero state (Q low—$\bar{Q}$ high);
2. the counters CN3, CN4 and CN5 (the lower register) in FIG. 28 are cleared to zero count (all outputs Q1, Q2, Q4 and Q8 low);
3. the counters CN6, CN7, and CN8 (the upper register) in FIG. 28 are cleared to zero count (all outputs Q1, Q2, Q4 and Q8 low);
4. the carry flip-flop FF2 in FIG. 28 is set to its one state ($\bar{Q}$ low); and,
5. the counters CN1 and CN2 in FIG. 27 are not involved since the BCD switches are set on their "O" terminals and the Range Switch RS1 is in contact with its "0—99.9-msec." contact.

With the switch S in FIG. 27 in its lower (stop/read mode) position as shown, the input to I1 is low to ground over the back contact 2 of switch S, thus making the output of I1 high at the lower input to gate G1: since the upper input to gate G1 is high through resistance R1, the output of gate G1 will be low corresponding to the low input at I1 from switch S. G1 and I1 comprise, in effect, a flip-flop circuit which disregards chatter at contact 2 of switch S since any variation at contact 2 cannot affect the output of I1 provided contact 1 remains high. With the output of I1 high, the output of I2 will be low to hold low the output of collector tie CT1 at the input to I5. The output of I5 is high at the lower input to G4 and the upper input to G4 is held high through resistance R9 from single-shot SS1: thus, the output of G4 is low, thus to enable FF1 to be cleared (Q low—Q high) responsive to a high-to-low transition at its CP input.

When switch S is operated (button pushed once from the position shown) so that the swinger opens contact 2 and closes contact 1, the low upper input to G1 forces the output of G1 to go high to correspond to the high input to I1 through resistance R2, thus making the output of I1 on lead 277 low. Lead 277 thus carries a high-to-low transition, which causes single-shot SS1 to produce at its output a high-to-low pulse of 25 μsec. through resistance R9 onto lead 278. The low on lead 277 becomes a high at the output of I2 at the lower input to collector tie CT1: the middle input to CT1 is also high from the output of I3, whose input on lead 279 is held low from I9, the input to which is held high from the output of G5, whose upper input is held low through contact F4-3 to ground on lead 270 over the wiper of switch arm BCDO. The 25-μsec. low pulse from SS1 causes the output of G4 to go high for 25 μsec. to the D input to FF1 (through contact F4-1) and to the right input to collector tie CT1. The output of collector tie CT1 is thus high for at least 25 μsec. at the input to I5, to produce a 25-μsec. low at the output of I5 and at the lower input to G4. The 25-μsec. low on lead 278 produces a 25-μsec. high at the output of G2 whose upper two inputs are permanently high. The 25-μsec. high output from G2 extends through I4 as a 25-μsec. low output from I4 at the right input to collector tie CT3, which provides a 25-μsec. low at its output (its left input is held high from I6) at the CL input to FF1. With the PS input to FF1 permanently high, a low on the CL input clears FF1 to its zero state (Q low—$\bar{Q}$ high).

The 25-μsec. high output from G2 causes the output of G3 (upper inputs permanently high) to go low for 25-μsec. on the direct clear lead 271 in FIGS. 27 and 28 (lead 271 is normally high). The 25-μsec. low on lead 271 in FIGS. 27 and 28 clears the upper and lower registers of FIG. 28 and sets the carry flip-flop FF2 of FIG. 28, as described below.

In FIG. 28, lead 271 is normally high, the output of SS7 is normally high, the output of G31 (lower inputs permanently high) is normally low, the output of I37 is normally high, the output of G32 (lower input permanently high) is normally low, and the output of G33 on lead 283 is normally high. The 25-μsec. low pulse on lead 271 produces a 2-μsec. low pulse at the output of SS7, a 2-μsec. high at the output of G31, a 2-μsec. low at the output of I37, a 2-μsec. high at the output of G32, and a 2-μsec. low at the output of G33 onto lead 283 at the CD inputs to counters CN3, CN4 and CN5 (the lower register). Since all of the inputs SD1, SD2, SD4 and SD8 to counters CN3, CN4 and CN5 are permanently high, the 2-μsec. low pulse on their CD inputs will clear all stages to zero, thus making low all of their outputs Q1, Q2, Q4 and Q8. At the end of this 2-μsec. pulse from SS7, the output of G33 returns to a high on the CD inputs to counters CN3, CN4 and CN5.

In FIG. 27, the output of G10 is normally low since its upper input is permanently high and its lower inputs are normally high from single-shots SS3 and SS5. Thus, the output of I20 is normally high on lead 273 into FIG. 28. Also, in FIG. 27, the output of G8 is normally low (on lead 275 into FIG. 28) since its upper input is permanently high, its middle input is held normally high from regeneration circuit REG, and its lower input is normally high on lead 271. Thus, in FIG. 28, the output of delay DEL4 is normally low at the left input to G14. In FIG. 28, the normal high on lead 273 becomes a low at the output of I21 and at the output of DEL5 at the lower input to G15, thus making the output of G15 normally high on lead 281 at the PS inputs to counters CN6, CN7 and CN8. The normally low output from DEL4 makes the output of G14 normally high at the input to SS6, whose output is normally high at the lower input to G16, thus making the output of G16 normally low on lead 282, which makes the output of I35 normally high at the SD input to the carry flip-flop FF2. Also, in FIG. 28, the normal high on lead 273 makes the output of G30 normally low and the output of I36 normally high at the K input to the carry flip-flop FF2. In FIG. 28, the normal low on lead 282 renders normally high the outputs of all of the transfer gates G18 through G29 at the CL inputs to the counters CN6, CN7 and CN8.

In FIG. 27, the output of G12 is normally high: the upper input of G12 is held high from the output of I13, whose input is held low from the output of I12, whose input is held high from SS2; the next-to-upper input to G12 is held low through contact F4–5 from the output of I10, whose input is held high from the output of G6, whose lower input is held low from DEL 3, whose input is held low from the output of I14, whose input is held high from the high $\bar{Q}$ output of the cleared input flip-flop FF1; and, the next-to-lower input of G12 is held low from the low Q output of cleared FF1. The lower input to G12 carries the 10 kHz. clock pulses (such as 50 μsec. low and 50 μsec. high). The normally high output of G12 becomes low at the output of I18, through switch RS1, at the input to SS4 on lead 272, into FIG. 28 on lead 272 and through contact F4–8 to the CP input to counter CN6. In FIG. 27, the normally high output of SS4 becomes a normal low at the output of I19 at the upper input to G13, whose output is thus normally high on lead 274 into FIG. 28 and through contact F4-7 to the CP input to counter CN3.

The 25-μsec. low pulse on lead 271 in FIG. 27 causes G8 to produce a 25-μsec. high pulse output on lead 274 into FIG. 28 to the input to DEL4, which, after a delay of 0.3 μsec., will produce a 24.7 μsec. high at the left input to G14. The 25-μsec. low pulse on lead 271 in FIG. 27 causes SS5 to produce a 5-μsec. low pulse at the lower input to G10, which thereupon produces a 5-μsec. high pulse at the input of I20. The resulting 5-μsec. low pulse at the output of I20 extends over lead 273 into FIG. 28 to the right input to gate G14 and to the input to I21. The 5 μsec. low at the right input to G14 prevents its output from going low for 5 μsec. The 5 μsec. low on lead 273 in FIG. 28 produces a 5 μsec. high from G30 and a 5 μsec. low from I36 at the K input to the carry flip-flop FF2: this 5 μsec. low on the K input to FF2 prevents FF2 from changing state for at least 5 μsec.

In FIG. 28, the 5 μsec. low at the input to I21 produces a 5 μsec. high at its output. This 5 μsec. high is delayed 0.6 μsec. in DEL5 to produce a 4.4 μsec. high at the lower input to G15, the output of which thereupon goes low for 4.4 μsec. on lead 281 to the PS inputs to counters CN6, CN7 and CN8. This 4.4-μsec. low pulse at the PS input to counters CN6, CN7 and CN8 (all of whose CL inputs are high) causes each of these counters to be preset to a capacity count of 15 (Q1, Q2, Q4 and Q8 high).

At the end of the 5 μsec. low on lead 273 in FIGS. 27 and 28, lead 273 returns to its normal high condition. This allows the output of G14 in FIG. 28 to go low to energize SS6 to produce a 2-μsec. low pulse at the lower input to G16. This causes the output of G16 to produce a 2-μsec. high pulse on lead 282. In the meantime, the return to high on lead 273 causes the output of G15 to return to high at the PS inputs to counters CN6, CN7 and CN8. With the PS inputs to these counters returned to high, the 2 μsec. high on the transfer lead 282 will transfer the count in the lower register to the upper register. Since the lower register (counters CN3, CN4 and CN5) had previously been cleared to zero count (all Q1, Q2, Q4 and Q8 outputs low), each of the inverters I23 through I34 will provide a high output to the right input to its corresponding transfer gate G18 through G29. The 2-μsec. high pulse lead 282 will produce 2 μsec. low pulses at the CL1, CL2, CL4, and CL8 inputs to the upper register. This will cause all cells of each of the counters CN6, CN7 and CN8 to be cleared to produce a count of zero in each counter (Q1, Q2, Q4 and Q8 low) to correspond to the zero count in the lower register.

The 2-μsec. high transfer pulse on lead 282 in FIG. 28 is also applied through I35 as a 2-μsec. low pulse at the SD input to the carry flip-flop FF2. Since the lead 273 in FIG. 28 has returned to a high condition, the K input to FF2 has changed from low to high. The 2 μsec. low at the SD input to FF2 sets FF2 into its one state (Q high—$\bar{Q}$ low).

At the end of the 2-μsec. low output from SS6 in FIG. 28, the transfer lead 282 is returned to low to disable the transfer gates G18 through G29 and the SD input to FF2 is returned to high to enable FF2 to respond to a high-to-low transition on its CP input (now being held low on lead 284 from the low A output of counter CN8).

At the end of the 25-μsec. low clearing pulse from single-shot SS1 in FIG. 27, the following changes take place. The lead 278 in FIG. 27 returns to high to in turn cause the output of G2 to return to low, the output of I4 to return to high, the output of collector tie CT3 to return to high (to remove the low clear pulse from FF1), to leave the output of G4 high due to the low on its lower input from I5, and to return the output of G3 to high on lead 271 in FIGS. 27 and 28. The return to high in FIG. 27 of lead 271 causes the output of G8 to return to low on lead 275 into FIG. 28, to in turn cause the output of DEL4 to return to low at the left input to gate G14, whose output returns to high.

The switch S in FIG. 27 remains in its clear/start position (contact 2 closed and contact 1 open) to retain a low output from I1, a high output from I2, and a high output from collector tie CT1, whose right input is held high from the output of G4 (at the D input to FF1), the lower input to which is held low from the output of I5, whose input is held high from the output of collector tie CT1.

SUMMARY OF CIRCUIT CLEARING

From the above description of the circuit clearing (initializing, normalizing, etc.) operation, the parts of the circuit are ready to accept dial pulse input information from the DIAL PULSE INPUT in FIG. 27.

In FIG. 27, the input flip-flop FF1 is cleared (Q low — $\bar{Q}$ high) with its PS input permanently high, its CL input high from collector tie CT3, its D input high from G4 and its CP input connected through contacts F4–2 and F4–4 to the output of the DIAL PULSE INPUT. In this condition, the input flip-flop FF1 is able to respond to a low-to-high transition at its CP input to make its Q output the same (high) as its D input.

In FIG. 28, the carry flip-flop FF2 is set in its one state ($\bar{Q}$ low) with its J input permanently low, its K input high from I36, its SD input high from I35, and its CP input low on lead 284 from the low A output of counter CN8. In this condition, the carry flip-flop FF2 is able to respond to a high-to-low transition at its CP input to clear itself ($\bar{Q}$ goes from low to high).

In FIG. 28, the lower register is cleared to zero count. Each of the counters CN3, CN4 and CN5 is set to zero count (Q1, Q2, Q4 and Q8 low) with its SD inputs permanently high and its CD input high from G33, with the CP input low to counter CN5 from the low Q8 output of counter CN4, with the CP input low to counter CN4 from the low Q8 output of counter CN3 via I22 and G17, and with the CP input high to counter CN3 from G13 of FIG. 27 via lead 274 and contact F4–7. In this condition, counters CN3, CN4 and CN5 are able to up-count from zero in response to high-to-low transitions at their CP inputs. Counter CN3 will respond to each high-to-low transition at its CP input and will produce a high-to-low transition at its Q8 output as it goes from a count of nine to a count of zero in response to the 10th high-to-low transition at its CP input. Counter CN4 will receive a high-to-low transition at its CP input each time counter CN3 counts the 10th high-to-low transition at its CP input. Likewise, counter CN5 will receive one high-to-low transition at its CP input each time counter CN4 counts the 10th high-to-low transition at its CP input.

The 10kHz. clock in FIG. 27 will be gated (as described below) through G12, I18, switch RS1, SS4, I19 and G13, over lead 274 into FIG. 28 and through contact F4–7 to the CP input to counter CN3 as high-to-low transitions: thus, counter CN3 will count tenths of milliseconds; counter CN4 will count units of milliseconds; and, counter CN5 will count tens of milliseconds.

In FIG. 28, the upper register is cleared to zero count. Each of the counters CN6, CN7 and CN8 is set to zero count (Q1, Q2, Q4 and Q8 low) with its CL inputs high from the transfer gates G18 through G29 and its PS input high from G15, with the CP input to counter CN8 low from the low Q8 output of counter CN7, with the CP input to counter CN7 low from the low Q8 output of counter CN6, and with the CP input to counter CN6 low from I18 in FIG. 27 via lead 272 and contact F4–8. In this condition, counters CN6, CN7 and CN8 are able to down-count from zero to nine to eight, etc. in response to low-to-high transitions at their CP inputs. Counter CN6 will respond to the first low-to-high transition at its CP input to change from zero count (Q1, Q2, Q4 and Q8 low) to a count of nine (Q1 and Q8 high—Q2 and Q4 low). The low-to-high Q8 output of counter CN6 will set counter CN7 from zero (Q1, Q2, Q4 and Q8 low) to nine (Q1 and Q8 high—Q2 and Q4 low). Likewise, the low-to-high Q8 output of counter CN7 will set counter CN8 from zero to nine. When counter CN8 goes from zero to nine (as will be discussed below) its A output provides a 1-$\mu$sec. pulse on lead 284 to the CP input of FF2. The 10 kHz. clock pulses in FIG. 27 will be gated (as described below) through G12, I18 and switch RS1, over lead 272 into FIG. 28 and through contact F4-8 to the CP input to counter CN6 as low-to-high transitions: thus, counters CN6, CN7 and CN8 will go from counts of zero to counts of nine on the first clock pulse; counter CN6 will then dissipate its count from 9 to 8 to 7 to 6 to 5 to 4 to 3 to 2 to 1 to 0 to 9, etc., responsive to successive clock pulses; counter CN7 will dissipate one count each time counter CN6 goes from zero to nine; and counter CN8 will dissipate one count each time counter CN7 goes from zero to nine. Thus respective counters CN6, CN7 and CN8 will subtract tenths, units and tens of milliseconds.

In FIG. 27, the 10 kHz. clock feeds the lower input to gate G12. As will be discussed below, when the first high break output occurs from the DIAL PULSE INPUT, the 10 kHz. clock will be gated through G12, I18 and switch RS1 to lead 272 at the input to single-shot SS4 to control the upper and lower registers of FIG. 28 to record a 10 kHz. clock pulse count indicative of the first high dial pulse input break interval.

LEADING EDGE OF FIRST HIGH BREAK

At the leading edge of the first high break interval (a low-to-high transition) from the DIAL INPUT of FIG. 27, the following circuit functions occur:

1. the input flip-flop FF1 of FIG. 27 is set to its one state (Q high—$\overline{Q}$ low);
2. 10 kHz. clock pulses are used to start down-counting in the upper register; and,
3. 10 kHz. clock pulses are used to start up-counting in the lower register.

The first low-to-high break transition from the DIAL PULSE INPUT of FIG. 27 extends through contact F4-4 to the CP input to the input flip-flop FF1 of FIG. 27 to set FF1 to its one state (Q high—$\overline{Q}$ low). The high-to-low change at the $\overline{Q}$ output of FF1 is effective through I14 and DEL3 to hold the lower input to G6 low for 0.3 $\mu$sec. and then allow that lower input to go high. This delays the enabling of gate G6 for 0.3 $\mu$sec., thus delaying the high-to-low change at the output of G6 for 0.3 $\mu$sec. which, through I10 and contact F4-5, holds the next-to-upper input to gate G12 low for the 0.3-$\mu$sec. delay time. The high Q output of FF1 makes the next-to-lower input to G12 high. The low-to-high input change at the input to I11 produces a high-to-low transition at the input to single-shot SS2, which thereupon produces a 12-$\mu$sec. low output pulse which is effective through I12 and I13 to force the upper input to gate G12 to low for 12$\mu$sec. and then back to high. Gate G12 is thus disabled (its output stays high) for at least 12 $\mu$sec.

After the 0.3-$\mu$sec. delay in DEL3, the lower input to gate G6 goes high to allow its output to go low. The output of I10 thereupon goes high and this high, through contact F4–5, makes the next to upper input to gate G12 high.

At the end of the 12-$\mu$sec. low from I13, the upper input to gate G12 is returned to high to thereby enable G12 to pass clock pulses from the 10 kHz. clock to the input of I18.

The high-to-low output of I11, responsive to the leading edge of the input break, causes delayed single-shot DELSS1 to produce a 1-$\mu$sec. low output pulse delayed 1 $\mu$sec.; but, this change has no effect at gate G5 (through I16) since G5 is disabled by the low ground on its upper input. This circuit is part of the automatic stop circuitry to be described later.

The high Q output of FF1 and the high output of I10 will cause gate G7 to produce a low output through DEL1 to the R9(1) input of counter CN2. Counter CN2 is involved only in making measurements of intervals greater than 99.9 msec. (see switch RS1 in FIG. 27) and its circuit function will be described later.

The first low-to-high clock pulse transition at the lower input to G12 will produce a high-to-low clock pulse output from G12 and a low-to-high clock pulse output from I18. The output from the 10 kHz. clock may be considered as a succession of 50-$\mu$sec. highs and lows; and these clock pulses are repeated at the output of I18 and through switch RS1 to (1) lead 272 into FIG. 28 and through contact F4–8 to the CP input to counter CN6 and to (2) the input in FIG. 27 of single-shot SS4. The first low-to-high clock pulse transition at the input to SS4 in FIG. 27 has no effect on the output of SS4.

The first low-to-high clock pulse transition at the CP input in FIG. 28 to counter CN6 causes counter CN6 to down-count from its starting count of zero to a count of nine, to in turn cause counter CN7 to down-count from zero to nine, to in turn cause counter CN8 to down-count from zero to nine. When counter CN8 goes from zero to nine, its A output provides a 1-$\mu$sec. high pulse over lead 284 to the CP input to the carry flip-flop FF2, which is cleared to its zero state ($\overline{Q}$ high) at the high-to-low trailing edge of the 1-$\mu$sec. pulse. The high $\overline{Q}$ output of FF2 extends over lead 276 into FIG. 27 to the lower input to gate G13 to enable G13 to pass low-to-high pulses at its upper input, which is being held low through I19 from the high output of single-shot SS4.

Regarding the first clock pulse count in the upper register, if the DIAL PULSE INPUT is synchronized with the 10 kHz. clock it can be arranged that the clock will be low when the leading edge of the first high break occurs from the input. This will delay the first count into the upper register for one-half of a clock period (50 $\mu$sec. or 0.05 msec.). If, on the other hand, nonsynchronous input is used, the first count into the upper register could occur at the instant that the 12-$\mu$sec. delay at the output of I13 (FIG. 27) enables gate G12. This could cause the first count to be effective at the upper register anywhere from 12 $\mu$sec. (0.012 msec.) to 50 $\mu$sec. (0.05 msec.) after the leading edge of the input break. A similar variation can occur at the trailing edge of an input break. The overall possible error is less than 1/5 percent when measuring intervals of the order of 100 msec. and around 1/20 percent when measuring intervals of the order of 1000 msec. These orders of error magnitude are not significant: thus, while synchronous operation is desirable, it is not essential.

When the first high clock pulse ends, at the high-to-low transition from the 10 kHz. clock in FIG. 27, I18 provides a high-to-low output transition. This low clock pulse on lead 272 has no effect on the upper register of FIG. 28. However, the high-to-low clock pulse transition at the input in FIG. 27 of single-shot SS4 causes SS4 and I19 to produce at the upper input to gate G13 a 1-$\mu$sec. high pulse, which G13 repeats at its output as a 1-$\mu$sec. low pulse on lead 274 into FIG. 28 and through contact F4-7 to the CP input to counter CN3. Counter CN3 responds to this high-to-low pulse at its CP input to up-count from its starting count of zero to a count of one.

According to the above, it will be seen that the leading edge (low-to-high) of the first high clock pulse (or the trailing edge of the previous low clock pulse) from the 10 kHz. clock causes the upper register of FIG. 28 to down-count by one count and that the trailing edge (high-to-low) of the first high clock pulse (or the leading edge of the succeeding low clock pulse) causes the lower register of FIG. 28 to up-count by one count.

DURING THE FIRST HIGH BREAK

It will be apparent from the previous description that throughout the duration of the first high break interval from the DIAL PULSE INPUT in FIG. 27 the upper register (counters CN6, CN7 and CN8) and the lower register (counters CN3, CN4 and CN5) in FIG. 28 will each count 10 kHz. clock pulses. The upper register will down-count the leading edge of each high clock pulse; and, the lower register will up-count the trailing edge of each high clock pulse. This means, with regard to gate G12 in FIG. 27, that the upper register will down-count each high-to-low output transition from G12 and the lower register will up-count each succeeding low-to-high output transition from G12.

This down-counting and up-counting in the upper and lower registers of FIG. 28 continues until the input from the DIAL PULSE INPUT in FIG. 27 changes from the high break to the low make.

TRAILING EDGE OF FIRST BREAK

When the DIAL PULSE INPUT of FIG. 27 changes its output from the high break to the low make, the following circuit functions occur:

1. down-counting in the upper register and up-counting in the lower register are stopped;
2. the upper register is preset to the maximum count of fifteen (all Q1, Q2, Q4 and Q8 outputs high);
3. the count in the lower register is transferred to the upper register and is retained in the lower register; and,
4. the carry flip-flop FF2 is set ($\bar{Q}$ low).

The change from the high break to the low make at the upper input to gate G6 in FIG. 27 produces a high output from G6, which results in a low output from I10, which extends over contact F4–5 to the next-to-upper input to gate G12. This forces the output of G12 high and the output of I18 low. If the 10 kHz. clock were low when the input change occurs, the output of I18 would be low and would not change; thus, the lower register would have up-counted the last high-to-low clock pulse transition from I18. This is what would be the case if the dial pulse input were synchronized with the clock. If, however, the 10 kHz. were high when the input change occurs, the break-to-make input transition would force the output of I18 to go from high-to-low to put one more count into the lower register. This is what might occur if nonsynchronous operation were involved: one extra count in the lower register, however, represents only 0.05 msec. out of perhaps 100 msec. and is of no practical consequence.

With the output of I18 held low, no further 10 kHz. clock pulses will be down-counted in the upper register or up-counted in the lower register. For example, assume that during the first break the lower register was up-counted to a count of 528 representing 52.8 msec. Counter CN5 will be set to a count of 5 (Q1 and Q4 high—Q2 and Q8 low), counter CN4 will be set to a count of 2 (Q2 high—Q1, Q4 and Q8 low), and counter CN3 would be set to a count of 8 (Q8 high—Q1, Q2 and Q4 low).

The high-to-low transition at the output of I10 in FIG. 27 extends through contact F4–6 to energize regeneration circuit REG to produce a 10-μsec. low output pulse at the input to single-shot SS3 and at the middle input to gate G8. This 10-μsec. interval provides a time during which each counter of the upper register is preset to its maximum count of 15, the count of 528 in the lower register is transferred into the upper register, the 528 count in the lower register is retained therein, and the carry flip-flop FF2 of FIG. 28 is set ($\bar{Q}$ low). These operations arrange the circuit for measuring the next high break interval, as will be described.

The 10-μsec. low at the middle input to gate G8 in FIG. 27 causes the output of G8 to go high for 10 μsec. on lead 275 into FIG. 28, where DEL4 delays the low-to-high transition for 0.3 μsec. and then makes the left input to gate G14 high for 9.7 μsec. (the balance of the 10 μsec. interval). The 0.3-μsec. delay is to prevent the inadvertent enabling of gate G14 for at least that amount of time. The high-to-low input to SS3 in FIG. 27 (the leading edge of the 10-μsec. low pulse from regeneration circuit REG) causes single-shot SS3 to produce a 5-μsec. low pulse, which causes G10 to produce a 5-μsec. high pulse, which causes I20 to produce a 5-μsec. low output pulse on lead 273 into FIG. 28 (1) to the input to I21, (2) to the right input to G14, and (3) to the upper input to G30. The 5-μsec. low at the upper input to G30 causes its output to go high to produce a 5-μsec. low pulse from I36 at the K input to the carry flip-flop FF2. With the K input to FF2 held low, no change in state of FF2 can occur for at least 5 μsec. The 5-μsec. low at the input to I21 causes its output to go high for 5 μsec. The low-to-high leading edge of the 5-μsec. high from I21 is delayed 0.6 μsec. by DEL5, which then causes the output of G15 to go low for 4.4 μsec. (the balance of the 5-μsec. interval). The 4.4-μsec. low from G15 is applied over lead 281 to the preset inputs PS of counters CN6, CN7 and CN8 to preset each counter to the count of 15 (Q1, Q2, Q4 and Q8 all high). At the end of the 4.4-μsec. preset interval, the output of I20 (FIG. 27) returns to high, the output of G15 (FIG. 28) returns to high, and the K input of FF2 (FIG. 28) returns to high.

When the output of I20 (FIG. 27) returns to high (at the end of the 4.4-μsec. preset interval), both inputs to gate G14 in FIG. 28 will then be high, one from I20 (FIG. 27) over lead 273 and one from DEL4, thereby to cause the output of G14 to go low for the last 5 μsec. of the 10-μsec. interval. The high-to-low transition at the output of G14 energizes single-shot SS6 to cause the output of G16 to produce onto the transfer lead 282 a 2-μsec. high pulse. The high pulse on lead 282 is applied through I35 as a 2-μsec. low pulse at the SD input to FF2 to set it to its one state ($\bar{Q}$ low). The low Q output from FF2 extends over lead 276 into FIG. 27 to disable gate G13.

While the carry flip-flop FF2 is being set by the 2-μsec. high pulse on lead 282, the same 2-μsec. high on lead 282 enables the transfer gates G18 through G29 of FIG. 28 to transfer to the upper register the count then in the lower register (during this transfer operation, the 2-μsec. low at the SD input of FF2 will override any change which may occur at the CP input of FF2 from the A output of counter CN8). Counter CN3 (set at a count of eight) will have its Q8 output high and its Q1, Q2 and Q4 outputs low. With the PS input to counter CN6 now high, and with counter CN6 set at 15 (Q1, Q2, Q4 and Q8 high), the lows at the Q1, Q2 and Q3 outputs of counter CN3 will cause the outputs of gates G18, G19 and G20 to go low at the CL1, CL2 and CL4 inputs to counter CN6, and the high at the Q8 output of counter CN3 will cause the output of gate G21 to remain high at the CL8 input to counter CN6. The lows on the CL1, CL2 and CL4 inputs to counter CN6 will cause its outputs Q1, Q2 and Q4 to go low and the high on the CL8 input to counter CN6 will allow its Q8 output to remain high. Counter CN6 thus is set to a count of eight (Q1, Q2 and Q4 low—Q8 high) as is counter CN3 of the lower register. Similarly, the count of 2 in counter CN4 is represented by Q1, Q4 and 28 low and Q2 high; the lows on the Q1, Q4 and Q8 outputs of counter CN4 will clear the corresponding cells of counter CN7 so that the Q1, Q4 and Q8 outputs are low and the Q2 output remains high to represent a count of 2. Also, the count of 5 in counter CN5 is transferred to counter CN8 by retaining outputs Q1 and Q4 of counter CN8 high and by clearing outputs Q2 and Q8 of counter CN8 low.

At the end of the 2-μsec. interval from single-shot SS6 in FIG. 28, the transfer lead 282 is returned to low at the output of G16. Then, at the end of the 10-μsec. interval from regeneration circuit REG. of FIG. 27, the output of G8 (FIG. 27) returns to low, the output of DEL4 (FIG. 28) returns to low, and the output of G14 (FIG. 28) returns to high, leaving the circuit in the condition it was in just before the start of the 10-μsec. timing interval generated by the regeneration circuit REG of FIG. 27.

At this stage in the circuit operation, the DIAL PULSE INPUT of FIG. 27 is still supplying the low make interval of the input dial pulses and each of the lower and the lower and upper registers contains the same count of 52.8 msec. (counters CN8 and CN5 set at 5, counters CN7 and CN4 set at 2, counters CN6 and CN3 set at 8). With the decimal point lamp DECPT of FIG. 28 lit and physically located between NX1 and NX2 and reading counters CN8, CN7 and CN6 in that order, the decoder and readout circuits will display the decimal numbers "52.8" at the maximum (first one so far) break.

START OF THE SECOND BREAK INTERVAL

When the second break interval occurs from the DIAL PULSE INPUT of FIG. 27, the output of I11 will go low to cause single-shot SS2 to produce a 12-$\mu$sec. low pulse output, which is effective through I12 and I13 to hold the upper input to gate G12 low for 12 $\mu$sec. and then to return it to high. Also, the output of G6 goes low, which is effective through I10 and contact F4-5 to make the next-to-upper input to gate G12 high.

At the end of the 12-$\mu$sec. interval from single-shot SS2, the upper input to gate G12 is returned to high to enable gate G12 to pass 10 kHz. clock pulses through I18 and switch RS1 to the input to single-shot SS4. As mentioned previously, gate G13 in FIG. 27 is disabled by a low on its lower input over lead 276 into FIG. 28 from the low $\bar{Q}$ output of the carry flip-flop FF2. This condition of FF2 will not change, if at all, unless the A output of counter CN8 of FIG. 28 provides a high-to-low transition to clear FF2: such will not happen unless the upper register (now containing a count of 528 in CN8, CN7, CN6) is down-counted to 000 and then to 999, as will be explained. With gate G13 (FIG. 27) thus disabled (its output on lead 274 stays high), the 1-$\mu$sec. output in FIg. 27 of single-shot SS4 (at the trailing edge of each high clock pulse) can pass through I19 but not through G13. Thus, no clock pulses are effective on lead 274 into FIG. 28 and through contact F4–7 at the CP input to counter CN3. Thus, the lower register does not up-count responsive to the clock pulses during the early part of the second break.

At the end of the 12-$\mu$sec. interval from single-shot SS2 in FIG. 27, the clock pulses at the input to SS4 are passed over lead 272 into FIG. 28 and through contact F4-8 to the CP input to counter CN6. The low-to-high clock pulse transitions at the leading edge of the high clock pulses are down-counted in counter CN6. With the count of 528 in the upper register (same as the lower register), it will require 528 clock pulses to reduce (or dissipate) the count in the upper register to zero (000). If the second break is equal to or of less duration than the first break (52.8 msec.), the upper register will not be driven past zero count (000) to a count of 999: but, if the second break is longer than the first break, the upper register will be driven to zero count (000), then to 999, then to 998, 997, etc. to some lower value depending upon how long the second break lasts.

SECOND BREAK NOT LONGER THAN FIRST BREAK

If it is assumed, for purposes of explanation, that the second break interval is of less duration (such as 50.9 msec.) than the first break interval (52.8 msec.), the first 509 clock pulses (10 kHz. at the CP input in FIG. 28 of counter CN6 will have reduced the count in the upper register to a count of 019 (528 minus 509) as the down-counting takes place. Counter CN8 will be set at 0, counter CN7 will be set at 1 and counter CN6 will be set at 9. Since counter CN8 has not been driven from the count of 0 to the count of 9, its A output will remain low, the carry flip-flop FF2 in FIG. 28 will remain in the set condition ($\bar{Q}$ low), and gate G13 in FIG. 27 remains disabled. Thus, no clock pulses have been added to the count of 528 still in the lower register and still representing the maximum of the two measured break intervals. As previously described, at the end of the second break interval, the regeneration circuit REG of FIG. 27 produces the 10-$\mu$sec. low output pulse during which (1) no further 10 kHz. clock pulses are supplied to either register, (2) the upper register is preset to its maximum count of 15 (all Q1, Q2, Q4 and Q8 outputs high), (3) the count of 528 in the lower register is transferred to the upper register, (4) the count of 528 is retained in the lower register, and (5) the carry flip-flop FF2 of FIG. 28 is controlled so that its $\bar{Q}$ output is low (set, if necessary). Thereupon, the readout circuits NX3, NX2 and NX1 of FIG. 28 will display the 52.8 msec. in the upper register as the maximum (so far) break interval.

If the second break interval were of such duration as to allow exactly 528 clock pulses to be down-counted in the upper register (second break exactly equal to the first break in duration), then the count in the upper register would have been reduced to zero (000). This would have the same result as above discussed since the carry flip-flop FF2 of FIG. 28 would still not be changed ($\bar{Q}$ still low) and the lower register clock gate G13 in FIG. 27 would still be disabled.

SECOND BREAK LONGER THAN FIRST BREAK

It will now be assumed, for purposes of explanation, that the second break interval is longer in duration (such as 54.3 msec.) than the first break interval (52.8 msec.) such as to cause more than 528 clock pulses (10 kHz.) (such as 543) to be down-counted in the upper register. This would represent a second (and longer) break of 54.3 msec. as compared to the first (and shorter) break of 52.8 msec. now registered in both registers.

The first 528 clock pulses reduce the count in the upper register to zero (000). The 529th clock pulse changes the zero (000) count in the upper register to a count of 999. This causes the A output of counter CN8 to produce a 1-$\mu$sec. high pulse, the high-to-low trailing edge of which is effective over lead 284 at the CP input to FF2 to clear FF2 to its zero state ($\bar{Q}$ high). The high $\bar{Q}$ output of FF2 extends over lead 276 into FIG. 27 to the lower input to gate G13 to allow the 1-$\mu$sec. "-clock pulses" from single-shot SS4 to pass through I19 and G13 as 1-$\mu$sec. low "clock pulses" on lead 274 into FIG. 28 and through contact F4–7 to the CP input to counter CN3. Each such 1-$\mu$sec. low clock pulse at the CP input of counter CN3, adds one count into the lower register. Thus, all clock pulses in excess of 528 (i.e., 15) will be serially added into the lower register. At the end of the second break (54.3 msec.), the lower register will contain a count of 543 (528 plus 15) and the upper register will contain a count of 985 (999 less 14). The lower register thus contains the maximum (so far) break interval count of 54.3 msec.

As previously described, at the end of the second break interval of 54.3 msec., regeneration circuit REG of FIG. 27 produces the 10-$\mu$sec. low output pulse during which (1) no further clock pulses are supplied to either register, (2) the upper register is preset to its maximum count of 15 (all Q1, Q2, Q4 and Q8 outputs high), (3) the count of 543 is transferred from the lower register into the upper register, (4) the count of 543 is retained in the lower register, and (5) the carry flip-flop FF2 in FIG. 28 is set ($\bar{Q}$ low), if necessary, by the 2-$\mu$sec. high transfer pulse on lead 282 through I35. Thereupon, the readout circuits NX3, NX3 and NX1 of FIG. 28 will display the 54.3 msec. in the upper register as the maximum (so far) break interval.

SUBSEQUENT BREAK INTERVALS

As long as the circuit is allowed to function with dial pulses being supplied from the DIAL PULSE INPUT of FIG. 27, the above process is repeated with the result that both the upper and lower registers end up with the same clock pulse count indicative of the maximum measured break interval and with the readout circuits displaying that result in tens, units and tenths of milliseconds.

The circuit action will stop if (1) the DIAL PULSE INPUT returns its output to a steady low make or if (2) the switch S in FIG. 27 is returned to its STOP/READ position as shown.

DIAL PULSE INPUT RETURNS TO STEADY MAKE

If the DIAL PULSE INPUT of FIG. 27 ceases to supply high break intervals, thus returning its output to a steady low make, the circuit will end up in the condition previously described during each make interval. The circuit merely awaits another high break which does not appear.

MANUAL STOP

Operation of the switch S in FIG. 27 to its position shown in the drawing will stop the circuit action even though the DIAL PULSE INPUT of FIG. 27 may continue to supply break and make intervals.

When switch S is moved to its downward position (where it will stay locked), the upper input to gate G1 is allowed to go high and the input to I1 is made low. Again, the flip-flop effect of G1 and I1 will disregard chatter at contact 1 provided contact 2 remains high. This will cause lead 277 at the output of I1 to go from low to high. I2 will cause the left input to collector tie CT1 to go low to make its output low at the input to I5. The output of I5 goes high to cause the output of G4 to be low. The low output of G4 holds the output of CT1 low and is effective through contact F4–1 to make low the D input to the input flip-flop FF1.

With the D input to FF1 low, the first low-to-high transition at the CP input will clear the flip-flop FF1 to its zero state ($\bar{Q}$ high). This low-to-high transition occurs at the leading stage of the next input break interval when the output of the DIAL PULSE INPUT in FIG. 27 goes to a high break condition at the end of the previous low make. When this occurs, the low-to-high input transition is effective through contact F4–4 and contact F4–2 at the CP input to FF1 to clear it (Q low—$\bar{Q}$ high). The low Q output of FF1 extends to the next-to-lower input to G12 to disable G12 from passing any further clock pulses. The high $\bar{Q}$ output of FF1 is effective through I14 and DEL3 to at once supply a high-to-low transition to the lower input to regeneration circuit REG. The low output of DEL3 is also effective at the lower input to G6 to disable G6 by making its output high. The high-to-low transition at the output of I10 also energizes the upper input to regeneration circuit REG.

Regeneration circuit REG of FIG. 27, upon being energized, produces a 10-μsec. low pulse for presetting each counter of the upper register to 15 (all Q1, Q2, Q4 and Q8 outputs high), for transferring the lower register count to the upper register, and for setting the carry flip-flop FF2 ($\bar{Q}$ low) in FIG. 28. This is a redundant step since the transfer operation was performed at the end of the previous measured break interval.

The circuit will not measure any more pulses, even though they may still be supplied by the DIAL PULSE INPUT of FIG. 27, until switch S is again moved to its upper position in FIG. 27.

AUTOMATIC STOP

The previous description assumed that in FIG. 27 the BCD switches were in the position shown to enable the circuit to process input information continuously until stopped either (1) by the DIAL PULSE INPUT providing a continuous low make input or (2) by the manual operation of the switch S to its lower contact 1. Under those circumstances gate G5 in FIG. 27 was disabled (steady high output) by virtue of the permanent low ground on its upper input, over contact F4–3, lead 270 and the wiper of switch BCDO, thus to hold the output of I9 permanently low on lead 279.

This low on lead 279 held the outputs of I3 and I6 high, which respectively held high one of the inputs to respective collector ties CT1 and CT3. The left input to collector tie CT1, and thus its output, was controlled solely by the output of I2, which in turn was controlled only by the state of G1 and I1 according to the position of switch S. The right input to collector tie CT3, and thus its output, was controlled only by I4, which caused the output of CT3 to be low (to hold the input flip-flop FF1 cleared, Q low—$\bar{Q}$ high) during the 25-μsec. initializing time and caused the output of CT3 to be high during the continuous processing operation.

The low on lead 279 also held high the output of I8 at the right input to collector tie CT2. This, in turn, placed the output of CT2 under the sole control of I7, which is controlled from the Q output of FF1. When the circuit is initialized, as previously described, flip-flop FF1 is cleared (Q low—$\bar{Q}$ high) and its low Q output is effective through I7 as a high at the left input to CT2: the output of CT2 is thus high and is effective through DEL2 to keep high the R9(1) input to counter CN1. The high R9(1) input keeps counter CN1 at a count of nine (A and D high—B and C low). As soon as flip-flop FF1 is set (Q high—Q low) to allow input pulse processing, its high Q output renders the output of DEL2 at low at once at the R9(1) input to counter CN1, thus to allow counter CN1 to respond to high-to-low transitions at its CP input. During input pulse processing, as previously discussed, the low-to-high leading edge of each high input break interval is effective to produce at the output of G6 (at the CP input to counter CN1) a high-to-low transition. This high-to-low transition causes counter CN1 to count one pulse to advance from the count of nine (A and D high—C and B low) to the count of zero (A, B, C and D low). In response to each such high-to-low transition at its CP input, counter CN1 will advance one count. Thus, from its starting count of nine, the first break input causes counter CN1 to advance to zero, the second break input causes counter CN1 to advance to one, etc., and the counter CN1 will arrive at the count of eight at the leading edge of the ninth input break and at the count of nine at the tenth input break.

The BCD switches in FIG. 27 are set at the number of break intervals to be measured before an automatic stop. If, for instance, it is desired to measure a series of six break intervals, the BCD switches will be set on contacts 6; this will stop the circuit when counter CN1 arrives at a count of six, which will be at the leading edge of the seventh break interval. The four diodes D1, D2, D4 and D8 are connected to the respective outputs A, B, C and D of counter CN1 and to the contacts of the BCD switches such that lead 270 connected to the wipers of all of the BCD switches will be low if any connected (through switches BCD) diode is held low at the A, B, C, D outputs of counter CN1 and will be high only if all connected diodes are held high from the A, B, C, D outputs of counter CN1. With the wipers held low, the circuit functions continuously just as in the case, previously described, when wiper BCDO was grounded (low) on its 0 contact. With switches BCD set on 6, for an automatic stop after measuring six break intervals, only diodes D2 and D4 are connected (through switches BCD2 and BCD4) to the common wiper lead 270 and through contact F4–3 to the upper input to gate G5. From the starting count of nine in counter CN1 (A and D high—B and C low), at least one of the outputs B and C always will be low until the counter CN1 arrives at the count of six (the leading edge of the seventh break input). The circuit will thus process input information continuously through the first six input break intervals.

When counter CN1 arrives at the count of six, at the leading edge of the seventh input break interval, the upper input to gate G5 is changed from low to high since the high B and C outputs of counter CN1 are high. The lower input to G5 is being held low from I16 due to the normal high output from the delayed single-shot DELSS1. At the leading edge (low-to-high transition) of the seventh break input, I11 provides a high-to-low output which energizes DELSS1, which provides a 1-μsec. low output pulse delayed 1 μsec. This delayed 1-μsec. high pulse at the lower input to G5, which thereupon provides a 1-μsec. low output pulse to produce at the output of I9 a 1 μsec. high pulse on lead 279.

The 1-μsec. high pulse on lead 279 is effective through I6 and CT3 (as a 1-μsec. low pulse at the CL input to FF1) to clear the input flip-flop FF1 (Q low—$\bar{Q}$ high) and is effective through I3 and CT1 (as a 1-μsec. low pulse input to I5 and a 1-μsec. high output from I5) to cause the D input to FF1 to be low, which holds the output of CT1 low. Also, the 1-$\mu$sec. high pulse on lead 279 is effective at once through I8, CT2 and DEL2 to hold the R9(1) input to counter CN1 low for at least 1 $\mu$sec. The low Q output of the cleared FF1 is effective through I7 as a high input to CT2 to allow the output of collector tie CT2 to go high as soon as the 1-$\mu$sec. clearing operations regarding I5, G4 and FF1 are finished. This high at the output of CT2 is then delayed 0.2 $\mu$sec. in DEL2 and is then applied as a low-to-high transition to the R9(1) input of counter CN1 to reset it to its starting count of nine.

At the end of the 1 $\mu$sec. stopping pulse on lead 279, lead 279 returns to a low condition. This low on lead 279 renders high the outputs of I3 and I6. The output of collector tie CT1 is held low from the low output of G4, whose upper input is held high from SS1 and whose lower input is held high from the output of I5, whose input is low at the output of CT1.

With the input flip-flop FF1 cleared (Q low—$\overline{Q}$ high) and with the D input to FF1 held low, FF1 will stay in its cleared condition until switch S in FIG. 27 is moved to its STOP/READ position (downward) and then back to its CLEAR/START position (upward). Such manipulation of switch S, as previously described, will produce a high-to-low transition on lead 277 to cause single-shot SS1 to produce the 25-$\mu$sec. low clearing pulse, which in turn will cause the output of G4 to go high to enable FF1 to be set (Q high—$\overline{Q}$ low) at the leading edge of the first subsequent high break interval to be measured.

MEASURING INTERVALS GREATER THAN 99.9 MSEC.

In the previous description it was assumed that intervals less than 100 msec. were to be measured. Consequently, in FIG. 27 switch RS1 was operated to the lower contact and switch RS2 in FIG. 28 was moved to the left position. With switch RS1 in its lower position, the 10 kHz. clock was gated through G12, I18 and switch RS1 to lead 272 and to the input to single-shot SS4. Under those circumstances, each 10 kHz. clock pulse represents 0.1 msec. of timing and the upper and lower registers of FIG. 28 count tens, units and tenths of msec. with the decimal point lamp DECPT in FIG. 28 lit to provide the decimal point between the units readout of NX2 and the tenths readout of NX1.

If switches RS1 and RS2 of FIGS. 27 and 28 are operated to their respective upper and right contacts, the circuit is adjusted to use counter CN2 of FIG. 27 to provide 1 kHz. clock pulses on its C output, over switch RS1, to lead 272, and to single-shot SS4. Each 1 kHz. clock pulse represents 1.0 msec. of timing and the upper and lower registers count hundreds, tens and units of msec. with the decimal point lamp DECPT extinguished.

With counter CN2 of FIG. 27 connected as shown, it acts as a binary coded decimal counter. If input R9(1) is high, the counter is adjusted to a count of nine (C low). When input R9(1) is low, then high-to-low pulses on the CP input will cause the counter to count from 9 to 8 to 7 to 6 to 5 to 4 to 3 to 2 to 1 to 0 to 9 to 8, etc. Upon initializing the circuit, as will be recalled, the input flip-flop FF1 is cleared (Q low—$\overline{Q}$ high). The low Q output of FF1 is applied to the upper input to G7, whose resulting high output is effective through DEL1 (after a delay of 0.3 $\mu$sec.) to make high the input R9(1) to counter CN2 to cause counter CN2 to go to a count of nine (C low) and stay there until the high is removed from the R9(1) input. The lower input to gate G7 is also made low from the output of I10 until gate G6 is enabled to pass dial pulse transitions to the circuit for measurement. As previously discussed, at the end of the 25-$\mu$sec. initializing pulse from SS1 in FIG. 27, flip-flop FF1 will respond to the first low-to-high leading edge break interval input to be set (Q high—$\overline{Q}$ low). The high Q output of FF1 makes the upper input to gate G7 high. The low $\overline{Q}$ output of FF1 is effective as a high through I14 and DEL3 (after a delay of 0.3 $\mu$sec.) to enable gate G6 to provide a low output: thereupon, I10 makes the lower input to gate G7 high and the output of gate G7 low, which is effective at once through DEL1 to apply a low to input R9(1) of counter CN2. High-to-low clock pulse (10 kHz.) transitions at the CP input to counter CN2 cause the counter to count each 10 kHz. clock pulse. Whenever output C of counter CN2 carries a low-to-high transition, such is effective through switch RS1 as a 1 kHz. clock pulse on lead 272 and at the input to SS4. From its starting count of nine (C low), the counter CN2 will cause output C to go from low-to-high when the count advances from a count of three to a count of four: at all other times output C is either low, or high, or changes from high-to-low. Thus, output C of counter CN2 will produce 1 kHz. clock pulses. At the end of each high break interval, the output of I10 will drive the lower input to G7 from high to low to produce a high output from G7 during the low make input. The high output from G7 is delayed 0.3 $\mu$sec. in DEL1 and then causes counter CN2 to be reset to the count of nine and to stay there until input R9(1) is made low at the start of the next high break input to be measured.

The rest of the circuit functions as previously described for measurement of intervals of less duration than 100 msec. under control of the 10 kHz. clock pulses.

It is to be understood that the above-described arrangement is illustrative of the application of the principles of the invention. Numerous other arrangements may be devised by those skilled in the art without departing from the spirit and scope of the invention.

I claim:

1. Circuitry for measuring the maximum time interval between pairs of signals among a plurality of such pairs comprising:

A. a source of pulses recurring at a constant frequency substantially greater than the recurrence frequency of the two signals of each pair;
B. a first pulse count register;
C. a second pulse count register;
D. means for causing pulses from the source to be counted in the first register during the first time interval between the signals of a first pair;
E. means controlled by the later occurring signal of each pair for causing the second register to contain a starting pulse count equal to the pulse count then in the first register;
F. means controlled by each pair of signals succeeding the first pair for subtracting source pulses from the starting pulse count in the second register during the time interval between the signals of such succeeding pair;
G. and, means controlled by the second register during the time interval between the signals of each succeeding pair for causing the pulse count in the first register to equal the sum of the starting pulse count in the second register and the number of source pulses in excess of the number required to reduce below zero the starting pulse count in the second register.

2. The invention defined in claim 1 wherein the means for causing the pulse count in the first register to equal the sum comprises:

A. means for retaining each pulse count in the first register;
B. and means for adding to the retained pulse count in the first register all source pulses in excess of the number required to reduce below zero the starting pulse count in the second register.

3. The invention defined in claim 2 wherein:

A. the second register comprises a down-counter responsive to each pulse transmitted thereto to reduce by one the pulse count therein;
B. and, the means for subtracting source pulses from the starting pulse count in the second register comprises first gating means controlled by a pair of signals for allowing source pulses to be transmitted to the down-counter during the time interval between the signals of the pair.

4. The invention defined in claim 3 wherein:

A. the first register comprises an up-counter responsive to each pulse transmitted thereto to increase by one the pulse count therein;

B. and, the means for adding source pulses to the pulse count in the first register comprises second gating means controlled by the down-counter during the time interval between the signals of a pair for allowing to be transmitted to the up-counter all source pulses in excess of the number required to reduce below zero the starting pulse count in the down-counter.

5. The invention defined in claim 4 wherein:

A. the down-counter includes means for providing a control signal upon the addition to the down-counter of a source pulse reducing to below zero the pulse count therein;

B. and, the second gating means is controlled by the control signal to allow source pulses to be transmitted to the up-counter.

6. The invention defined in claim 5 wherein:

A. the down-counter comprises a plurality of binary counting stages settable from zero pulse count to capacity pulse count upon the transmission thereto of a source pulse;

B. and, the means for providing a control signal comprises a control signal generator controlled by the down-counter to generate the control signal whenever the down-counter is set from zero pulse count to capacity pulse count.

7. The invention defined in claim 6 wherein:

A. the up-counter comprises a plurality of binary counting stages;

B. and, means for causing the second register to contain a starting pulse count equal to the pulse count then in the first register comprises a plurality of transfer gates connected between the up-counter and the down-counter and controlled by the later occurring signal of a pair to transfer to the down-counter as a starting pulse count therein the pulse count then existing in the up-counter.

8. The invention defined in claim 7 wherein the first gating means comprises a first gate connected between the source of pulses and the down-counter.

9. The invention defined in claim 8 wherein the second gating means comprises a second gate connected between the first gate and the up-counter.

10. The invention defined in claim 7 wherein the means for causing source pulses to be counted in the first register during the first time interval between the signals of a first pair comprises means effective prior to measurement of time intervals for registering zero pulse count in the up-counter by setting all stages thereof to binary zero.

11. The invention defined in claim 10 wherein the means for causing source pulses to be counted in the first register during the first time interval between the signals of a first pair also comprises means effective prior to measurement of time intervals for registering zero pulse count in the down-counter by setting all stages thereof to binary zero.